UNITED STATES PATENT OFFICE.

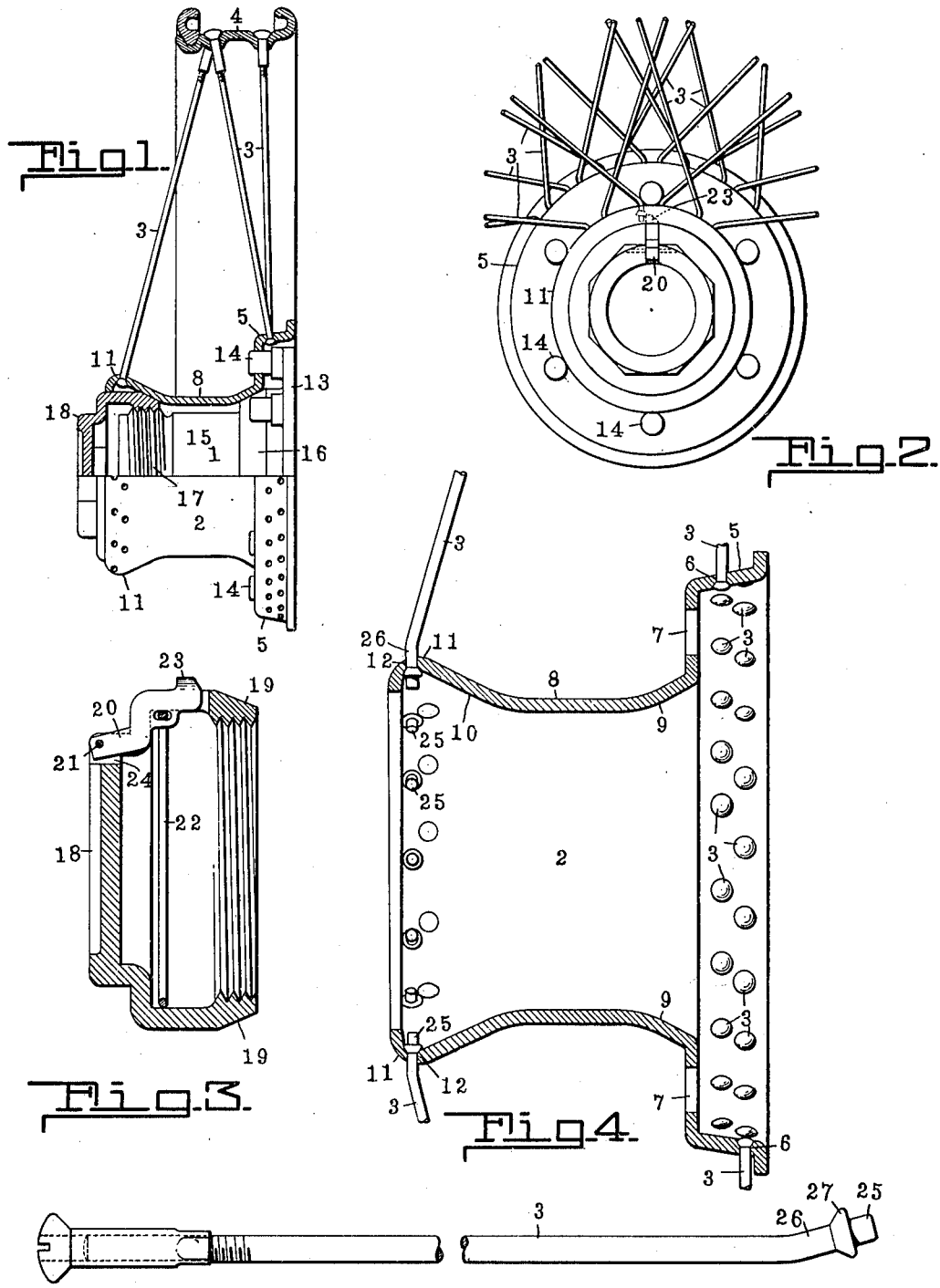

CHARLES S. ASH, OF BUFFALO, NEW YORK, ASSIGNOR, BY MESNE ASSIGNMENTS, TO WIRE WHEEL CORPORATION OF AMERICA.

DETACHABLE WHEEL FOR AUTOMOBILES.

1,313,976. Specification of Letters Patent. Patented Aug. 26, 1919.

Application filed July 14, 1916. Serial No. 109,275.

*To all whom it may concern:*

Be it known that I, CHARLES S. ASH, a citizen of the United States, residing at Buffalo, in the county of Erie and State of New York, have invented certain new and useful Improvements in Detachable Wheels for Automobiles, of which the following is a full, clear, and exact description, such as will enable others skilled in the art to which it appertains to make and use the same.

This invention relates to vehicle wheels, and more particularly to improved wire wheels for automobiles wherein the tire-carrying parts, comprising the rim and connected hub shell, are quickly detachable as a unit from the driving hub.

One of the objects of the invention is to provide simplified and improved means enabling expeditious attachment of the hub-cap nut and insuring against its accidental rotation in the reverse direction when properly positioned.

Other objects and advantages will be in part noted hereinafter in connnection with a typical embodiment of the invention illustrated in the accompanying drawings, wherein—

Figure 1 is a side view, partially in section, of an automobile wheel;

Fig. 2 is a partial end view thereof;

Fig. 3 is a sectional view of the hub-cap nut;

Fig. 4 is a sectional view of the detachable hub shell; and

Fig. 5 is an elevational view of an improved spoke.

Referring more particularly to the drawings, there is illustrated a wire spoked wheel comprising a driving hub 1, a detachable hub 2 fitting thereon and connected by spokes 3 to a tire-supporting rim 4. The hub shell 2 is preferably of pressed or stamped steel and is formed with an enlarged inner flange 5 having a plurality of spoke apertures 6 and with a tubular portion 8 of reduced diameter, at the interior ends of which are machined tapered surfaces 9 and 10, the latter merging integrally into a curved spoke flange 11 at the outer end of the hub. The flange 11, like flange 5, is also provided with a plurality of spoke-receiving apertures 12. The inner driving hub 1, designed to encircle the vehicle axle, carries an integral or fixed flange 13 at its inner end, on which are provided a plurality,— in this instance, six—of driving lugs 14 which project through driving apertures 7 of the hub shell 2 to lock these parts together against relative rotation. The hub 1 also is provided with a body portion 15 of reduced diameter having a machined tapered surface 16 at its inside end to engage the complementary surface 9 of the hub shell and a threaded portion 17 at its outside end to which the cap nut 18 may be screwed to hold the parts against axial separation.

As shown in Fig. 1, where the detachable hub 2 is illustrated as positioned home on the inner driving hub 1, the nut 18 is provided at its inner edge with an interiorly threaded and exteriorly tapered portion 19, so that as the nut is screwed upon the threaded extremity 17 of the inner hub, the tapered edge 19 wedges into engagement with the complementary tapered portion 10 of the outer hub. In this manner the cap nut draws together axially the driving and detachable hubs and forces the coacting cam surfaces 9—16 and 10—19 into binding and firm engagement.

While the wedging action of the nut 18 might be sufficient to insure against any accidental removal, there is preferably also provided a supplementary locking means to positively prevent the nut from unintentional rotation in the direction of loosening. For this purpose the nut carries a spring-pressed pawl 20 pivoted to the outer end of the nut, at 21, and urged by a resilient ring 22 outward to carry the pawl latch 23 through a slot 24 in the nut. The latch 23 is also beveled to facilitate its entry through the open end of the hub 2.

A ratchet device is provided within the shell flange 11 to coact with the latch 23. This device, as shown, comprises integral extended heads 25 on the spokes projecting through the outer series of apertures in the flange 11. These spokes, formed of tough metal, are thoroughly reliable to provide the requisite strength. As shown in Fig. 5, the headed spokes are preferably formed of swaged wire having offset ends 26 with enlargements 27, beyond which project the heads 25 formed integral therewith during the process of manufacture. It will be noted that the structure described provides a durable ratchet device, which is integral with other parts and therefore incapable of loosening, and at the same time the manufacturing cost is not increased.

The hub shell 2, as illustrated, is also particularly advantageous in the arrangement of staggered spoke apertures 6 on the inner flange and the staggered apertures 12 on the outer flange 11 since the position of these apertures permits improved lacing of the spokes and enables the crossing spokes of the respective tangential sets to interlace without bending. The curved outer spoke flange 11 also functions as a desirable protective covering for the points of attachment of the spokes and affords space for the spoke ends 25 constituting the locking ratchet.

Having described my invention, what I claim as new and desire to secure by Letters Patent is:

1. A detachable wheel comprising in combination an inner hub, a hub shell mounted thereon and having spokes secured thereto, certain of said spokes having heads projecting within said shell, a cap nut carried by the inner hub and locking means mounted on and carried by said nut to engage the inwardly projecting spoke heads, and prevent reverse rotation of the cap nut.

2. A detachable wheel comprising in combination an inner hub, a hub shell mounted thereon, spokes secured to said shell and having heads projecting within the shell, a cap nut screw threaded on the outer end of said inner hub, and having peripheral surface and tapered inner end, said hub shell having an internally tapered portion on the inner side of said spoke heads complementary to and bearing upon the tapered inner end of the cap nut and having its edge portion lying beyond the spoke heads turned inwardly to the peripheral surface of the cap nut to inclose said spoke heads, and locking means mounted on and carried by the cap nut to engage the projecting heads of the spokes.

In testimony whereof I affix my signature, in the presence of two witnesses.

CHARLES S. ASH.

Witnesses:
G. W. HOUK,
H. WALROR.